Sept. 29, 1970    T. M. TOROSIAN    3,531,345

REPAIR OF AUTOMOTIVE EXHAUST SYSTEM

Original Filed Sept. 8, 1964

INVENTOR
THEODORE M. TOROSIAN

BY *Norman S. Blodgett*
ATTORNEY

United States Patent Office 3,531,345
Patented Sept. 29, 1970

3,531,345
REPAIR OF AUTOMOTIVE EXHAUST SYSTEM
Theodore M. Torosian, 190 Russell St.,
Worcester, Mass. 01609
Continuation of application Ser. No. 633,657, Apr. 3, 1967, which is a continuation of application Ser. No. 394,671, Sept. 8, 1964. This application Nov. 8, 1968, Ser. No. 774,542
Int. Cl. B32b 7/00, 35/00; F16l 55/16
U.S. Cl. 156—94       2 Claims

ABSTRACT OF THE DISCLOSURE

This invention relates to the repair of an automotive exhaust system and, more particularly, to a method for reconstructing the muffler of an automobile when corrosion has formed a leak which renders it ineffective.

CROSS-REFERENCE TO RELATED APPLICATIONS

This application is a continuation of my abandoned patent application Ser. No. 633,657 filed Apr. 3, 1967, which is a continuation of my abandoned patent application Ser. No. 394,671 filed Sept. 8, 1964.

With the increased use of salt on highways, there has come about a rapid destruction of the exhaust systems of automobiles. Usually, this comes about in the form of an opening in the muffler housing caused by corrosion of the outside of the housing due, in the winter time, to salt deposits from the highway and to the abrasive action of sand on the roads. Furthermore, the muffler housing is subject to corrosion by the condensation of vapors from the products of combustion emitted by the automobile engine, which condensate contains considerable amounts of acid. When such a leak appears in the body of the muffler, even though the opening may be quite small, the muffler is rendered ineffective because the gas is allowed to expand through the opening so that the muffler is ineffective to reduce the noise. Although the remainder of the muffler may be in fairly good condition, the owner of the automobile must, nevertheless, replace the entire muffler with a new one. The old muffler, which may be in a fair state of condition aside from the single opening in the housing, is necessarily discarded. These and other difficulties experienced with prior art practice have been obviated in a novel manner by the present invention.

It is, therefore, an outstanding object of the invention to provide a method for repairing automotive mufflers by which means the life of a muffler may be extended and the need for replacing a muffler at frequent intervals is obviated.

Another object of this invention is the provision of a method of repairing a muffler which is inexpensive to carry out and which does not require any unusual apparatus of tools.

A further object of the present invention is the provision of a method of repairing mufflers which may be used by unskilled labor and which may be carried out by the owner of the automobile without assistance from an automotive mechanic.

It is another object of the instant invention to provide a process of repairing an automotive exhaust system which involves relatively simple and inexpensive materials, which may be sold in kit form to the operator of the motor vehicle, and which may be carried out by him in a very short time to completely cover an aperture in the system for restoring it to its former effectiveness.

With these and other objects in view, as will be apparent to those skilled in the art, the invention resides in the combination of steps set forth in the specification and covered by the claims appended hereto.

Figure 1:
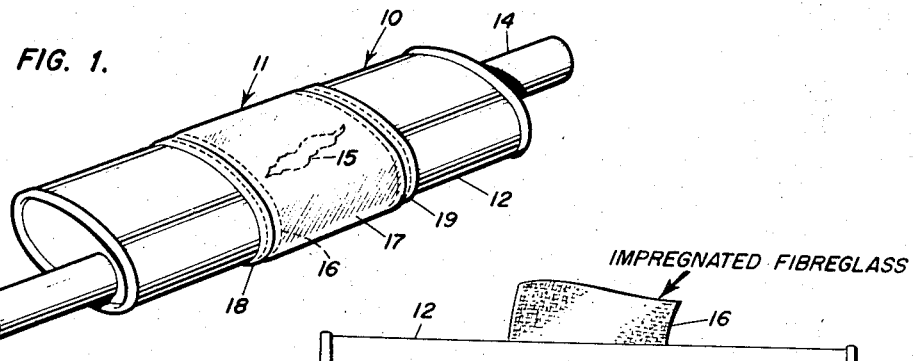
Figure 2:
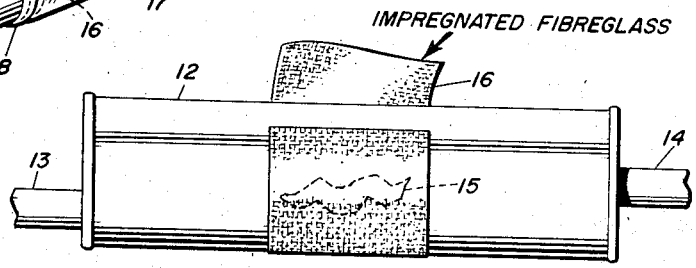
Figure 3:
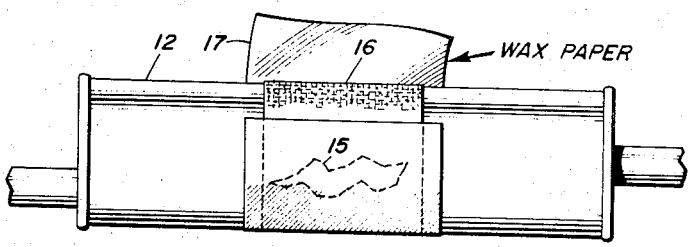
Figure 4:
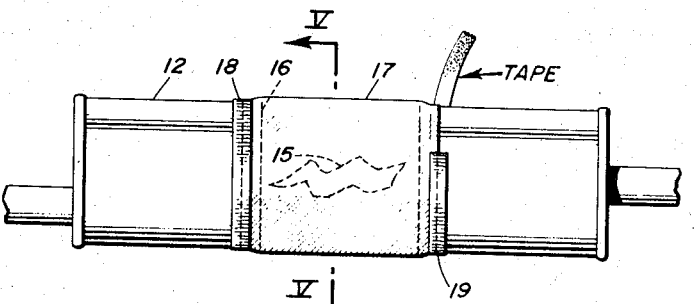
Figure 5:
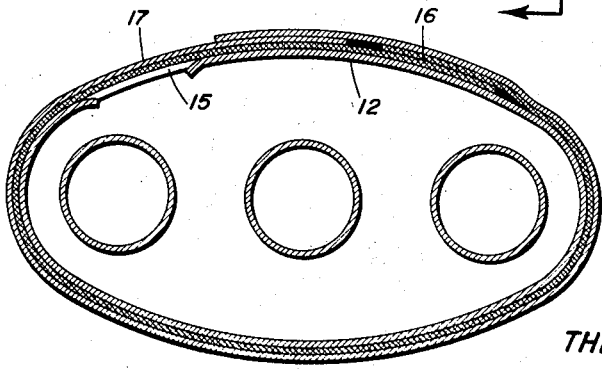

The character of the invention, however, may be best understood by reference to one of its preferred forms as illustrated by the accompanying drawings in which:

FIG. 1 is a perspective showing an automobile muffler which has been repaired in accordance with the principles of the present invention, FIG. 2 illustrates a step in the repair of a muffler, FIG. 3 illustrates a second step in the repair of a muffler, FIG. 4 shows a third step in the repair of a muffler, and FIG. 5 shows a sectional view of a completely repaired muffler taken on the line V—V of FIG. 4.

Referring to FIG. 1, which shows the general aspects of the invention, a completely repaired automotive muffler 10 is shown in use with a patch 11. The muffler consists of a hollow main body 12 having a generally oval-shaped cross-section adapted to lie longitudinally of the underside of an automobile body. At one end is connected an input pipe 13 leading to the muffler from the automobile engine manifold (not shown) or from the other end extends a tail pipe 14 through which the products of combustion from the engine are expelled into the atmosphere.

The aperture in the main body 12, which is to be repaired, is indicated by the reference numeral 15 and is, of course, covered by the patch 11 made up of a glass fiber portion 16, a paper portion 17, and tapes 18 and 19.

Referring to FIG. 2, which shows the first step of the method of applying the patch 11, the main body 12 of the muffler may be removed from the automobile, or it may remain in place on the automobile and the work done with the muffler in that position. In either case, a sheet of glass fiber portion 16 is applied in the form of a band. The material from which this sheet is formed is a woven glass fiber cloth which has been pre-impregnated with an uncured plastic or resin. This plastic may either be of the polyester type or of the epoxy type, but has the ability to become hard upon the application of heat. The glass fiber portion 16 is wrapped tightly around the main body 12 of the muffler in order completely to cover the hole 15.

Referring to FIG. 3, the next step is to apply the paper portion 17. This portion may be formed of any disposable material but, in the preferred embodiment, is a sheet of wax paper; the paper is wrapped around the muffler, covers the impregnated glass fibers completely, and extends outwardly of the ends of the glass fiber portion.

Referring next to FIG. 4, it can be seen that a tape 18 is applied at one end of the paper portion, while a tape 19 is applied to the other end. In most cases, the tape is of the type known as "masking" tape having a body formed of a heavy crepe paper substance to which is applied a pressure-sensitive adhesive. The tape overlaps the wax paper and contacts the surface of the main body 12 of the muffler to hold in place the glass fiber and paper portions previously applied.

The final step of the operation is to pass hot products of combustion through the muffler. This is usually done by starting up the engine of the automobile and allowing the exhaust gases to pass through the muffler. When this is done, the muffler rapidly reaches a high temperature and the curing of the plastic with which the glass fiber portion 16 is impregnated takes place very rapidly, forming a hard shell which is bonded closely to the main body of the muffler. At that time, the tapes 18 and 19 and the paper portion 17 may be removed or, if appearance is not a consideration, may be left in place where they soon deteriorate and leave the muffler with only the glass fiber portion 16 in place on the muffler.

FIG. 5 shows that the main body 12 of the muffler is formed of sheet metal in an oval shape and that an aperture 15 extends through the wall. As is evident in the picture, the glass fiber portion 16 may consist of more than one layer; there certainly should be a certain amount of overlapping of the ends of the band which forms the glass fiber portion. In a similar way, the paper portion 17 is provided with considerable overlap. One of the advantages of using wax paper is that it will not adhere readily to the plastic portion and may be easily removed. In the meanwhile, during the heating operation, it holds the glass fiber sheet in place tightly around the muffler.

It can be seen that by the practice of the present method it is possible to place the conventional automotive muffler in an effective state of operation without either any great expense or any time-consuming operation. It is possible to place the glass fiber portion, the paper portion, and the tapes in place in a very short time and to drive the automobile away immediately. The curing of the plastic sheet will then take place while the automobile is proceeding along the highway, although the preferred method is to allow the automobile to stand still while curing is taking place. Actually, the glass fiber sheet covered with the uncured plastic is fairly stiff, but when the muffler is heated up, the sheet and the plastic soften up, forming a tightly-conforming wrap around the muffler which is then cured in place to form a hard shell. When this is accomplished, the glass fiber conforms to any irregularities in the muffler surface caused by the dents and the like and forms a very tight effective cover for the aperture in the muffler. Furthermore, a substantial patch of this type brings about a considerable amount of damping in the metal body of the muffler so that the muffler does not rattle and reverberate the way it did when it was new, so that it is even more effective in reducing noise.

It is obvious that minor changes may be made in the steps of carrying out the invention without departing from the material spirit thereof. It is not, however, desired to confine the invention to the exact steps herein shown and described, but it is desired to include all such as properly come within the scope claimed.

The invention having been thus described, what is claimed as new and desired to secure by Letters Patent is:

1. Method for repairing a portion of the exhaust system of a motor vehicle, comprising the steps of:
    (a) wrapping the muffler with glass fiber pre-impregnated with an uncured plastic,
    (b) covering the glass fiber with a disposable and deterioratable sheet to hold the glass fiber in place,
    (c) fastening the disposable and deterioratable sheet in place, and
    (d) passing hot exhaust gases from the engine through the muffler to cure the plastic and deteriorate the sheet.

2. A method of repairing an automotive exhaust duct, comprising the steps of:
    (a) wrapping the duct with a glass fiber sheet pre-impregnated with an uncured plastic,
    (b) providing the glass fiber sheet with deterioratable means to retain it in place despite heating, and
    (c) subjecting the duct and the sheet to heat to cure the plastic and deteriorate said means to retain the heat being provided by operating an internal combustion engine associated with the exhaust duct so that hot gaseous products of combustion pass through the duct.

References Cited

UNITED STATES PATENTS 2,795,523  6/1957  Cobb et al.
3,235,289  2/1966  Jones.

OTHER REFERENCES

"Modern Miracle in Sheet Metal Reconditioning," pp. 1–8 (a Chevrolet booklet), March 1955, Chevrolet Motor Division, General Motors Corporation, Detroit 2, Mich.

BENJAMIN A. BORCHELT, Primary Examiner

T. H. WEBB, Assistant Examiner

U.S. Cl. X.R.

138—99